United States Patent [19]

Rinaldi

[11] Patent Number: 4,941,280
[45] Date of Patent: Jul. 17, 1990

[54] TWO-PIECE BODY FISHING LURE

[75] Inventor: George M. Rinaldi, 6 Green St., Camillus, N.Y. 13031

[73] Assignee: George Matthew Rinaldi, Camillus, N.Y.

[21] Appl. No.: 404,420

[22] Filed: Sep. 7, 1989

[51] Int. Cl.⁵ .............................................. A01K 83/00
[52] U.S. Cl. .................................... 43/42.36; 43/42.09
[58] Field of Search ................. 43/42.36, 42.09, 42.22, 43/42.38

[56] References Cited

U.S. PATENT DOCUMENTS 2,875,549 3/1959 O'Sullivan .......................... 43/42.36

Primary Examiner—M. Jordan

[57] ABSTRACT

A two-piece body type fishing lure has upper and lower parts that are held together by a dovetail-type sliding joint. The dovetail can be wider at the rear and narrower towards the front so that the upper part can be removed only be sliding it forward. The color and pattern of the lure can be changed by interchanging various top portions with a common lower portion, which need not be removed from the line in order to change the upper portion.

7 Claims, 1 Drawing Sheet

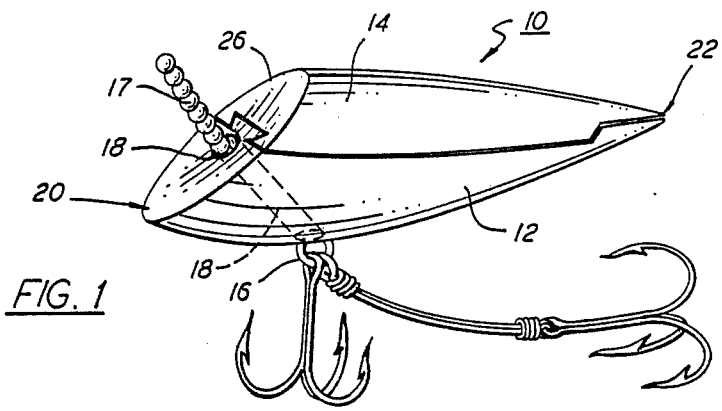
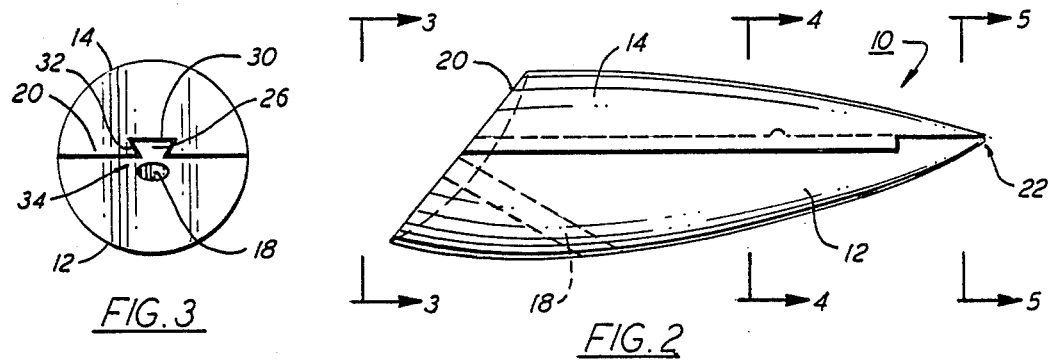
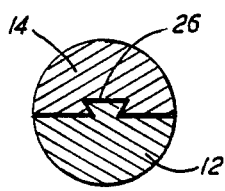
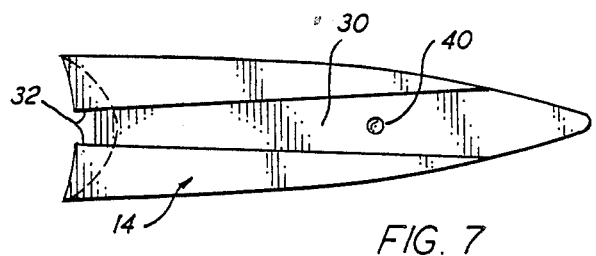
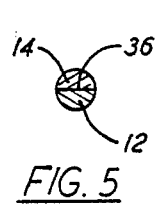
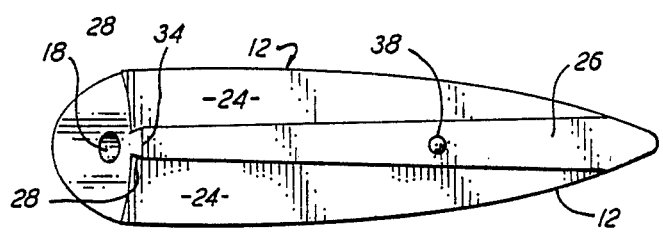
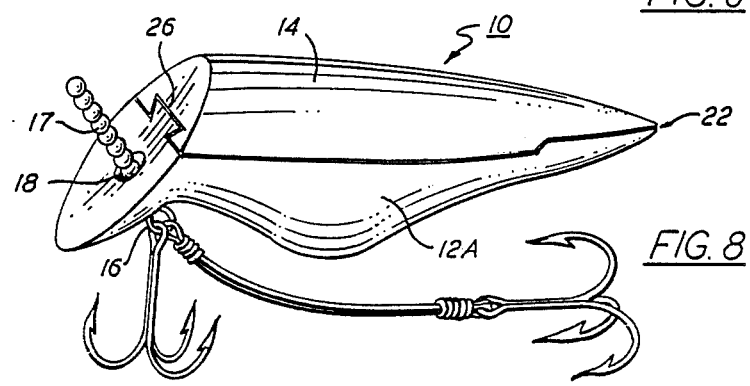

4,941,280

TWO-PIECE BODY FISHING LURE

BACKGROUND OF THE INVENTION

This invention relates to artificial fishing lures, and is more specifically directed to body-type lures or plugs.

It is well known among fishermen that game fish show a preference for different colors, color patterns, and silhouettes of prey fish at different times of the day, in different seasons, and even at different parts of the same body of water. Therefore, fishermen traditionally need to keep a large variety of lures on hand, with several different color schemes and several different shapes of each color of lure. This can make fishing quite expensive, as fishermen need to purchase a very large number of lures.

However, with most lure patterns, usually only the top half of the lure is colored or patterned, with the lower part of the lure being either white or metal plated.

The fisherman will generally change lures several times until he finds one of a pattern that the fish seem to be attracted to. Each time that the lure is changed, the old lure must be removed from the line and the new lure attached. In that case, there is always the risk of catching a hook on the fisherman's hand.

Insert-type lures have been previously proposed. These lures typically consist of a clear plastic body with interchangeable Mylar film inserts. The inserts are replaced to change the lure color. With this type of lure, it is necessary to pull or screw the lure body apart in order to change the Mylar film insert.

OBJECTS AND SUMMARY OF THE INVENTION

It is an object of this invention to provide a universal type of lure in which a common lower part can be used with any number of slide-on upper parts, and which can be provided in any number of colors and patterns.

It is another object of this invention to provide a body-type lure in which the top half can be changed without removing the lower half from the fishing line.

It is a further object of this invention to provide a lure which permits fishermen to present the lure in a wider assortment of colors or patterns, without having to purchase as many pieces to have a complete set of lures.

In accordance with an aspect of this invention, a body-type fishing lure or plug has a lower body part and an upper body part that slidably attaches to the lower body part in a fashion such that each upper body part is interchangeable with similar upper body parts. In this fashion, the appearance of the lure can be easily changed to suit fishing conditions. The lower body part has a longitudinally oriented keyway, which can be a dovetail rib or tongue, on an upper surface thereof. The upper body part has an engaging structure that is longitudinally oriented on a lower surface and which slidably mates with the keyway structure. In its preferred embodiment, the upper body part is slidably removable from the lower body part only by sliding it in the forward direction. In a preferred embodiment, the tongue on the lower body part and the mating groove on the upper body part are tapered so as to be narrow at the front and wide towards the rear. Also, a ball detente can be included in one or the other of the upper and lower body parts, with a mating indentation in the other, so that the upper and lower portions are held in position after they are slid together.

The basic concept of this invention can be applied to any of a large variety of plug styles, although a Canadian-type trolling plug is shown in the preferred embodiment whose description follows. The two-piece plug can be sold with or without the hook assembly and other hardware. Preferably, a number of upper body parts are included in each set, each of a different pattern style or different color, and, additionally, the upper body parts can be used with lower body parts of different styles. With this system, the fisherman has the ability to change colors of lures at smaller expenditures, because the part that is changed, namely the upper part, is considerably less expensive than the lower part, which contains the hardware, i.e., hooks, split rings, etc. Also, a considerably smaller tackle box is required to house the same assortment of lures.

The above and many other objects, features, and advantages of this invention will become apparent from the ensuing description of a preferred embodiment, which should be read in connection with the accompanying drawing.

BRIEF DESCRIPTION OF THE DRAWINGS

FIG. 1 is a perspective view of a two-piece body lure according to one embodiment of this invention.

FIG. 2 is a side elevation of the body lure of this embodiment.

FIG. 3 is an end view taken at 3—3 of FIG. 2.

FIGS. 4 and 5 are sectional views taken at 4—4 and at 5—5 of FIG. 2, respectively.

FIGS. 6 and 7 are plan views of the lower portion and upper portion, respectively, of the body lure of this embodiment.

FIG. 8 is a perspective view of a second body lure of this invention which employs the same upper portion as in FIG. 1, but a different lower portion.

DETAILED DESCRIPTION OF A PREFERRED EMBODIMENT

With reference to the drawing, and initially to FIG. 1, a body-type fishing lure 10 according to one of many possible preferred embodiments is of the so-called Canada plug style. The lure 10 has a lower body portion 12 which can be, e.g., white or silver in color, (but not limited to just these colors) and an upper body portion 14, which can be any desired color, in solid, spotted, striped, or any other desired pattern. These body portions 12 and 14 can be molded of a foam plastic material of suitable hardness and durability.

Hook rigging hardware 16 for the lure has a ball chain 17 that extends through a bore 18 in the lower body portion 12. This is a well-known retrievable-lure type of hook rigging. However, fixed-hook and fixed-key types of lures can also be constructed according to this invention.

As also shown in FIGS. 2-7, the lure 10 has a slant, concave face 20 at the front end of the lure body and a pointed tail 22 at the rear end of the lure body. The lower body portion has a generally flat top surface 24, with a tongue 26 or dovetailing wedge-shaped rib extending longitudinally thereon. The tongue 26 has undercut sides, and mates with a dovetailing groove 30 that is cut on a flat lower surface of the upper body portion 14. The groove 30 has undercut sides 32 that bias against the sides 28 of the tongue 26 to resist separation in the vertical direction.

As shown in FIGS. 3-7, in this particular example, the tongue 26 and groove 30 are narrow at a front end 34 and taper outwards to be relatively wider at a rear end 36 thereof. This ensures that the upper body portion can be slid off of the lower body portion 14 only in the forward direction. The drag forces during trolling or retrieval will lock the upper and lower portions securely together. In other embodiments, the tongue 26 and groove 30 can be provided without taper. As shown in FIGS. 6 and 7, a ball detente 38 is provided on the lower or male portion 12, with a receptacle 40 or indentation for the ball detente being provided in the upper portion 14. The purpose of this structure is to provide a positive click stop when the two portions 12 and 14 are slid together.

As shown in FIG. 8, the same top 14 can be applied to a lure lower body portion 12A of a significantly different profile and action style, in this case, a billed deep-diver lure. The lure lower body portion 12A should have a dovetailing tongue 26 on its upper surface, so that it is compatible with the upper body portion 14. The lower body portions can be sinking or floating.

As should be apparent, many other styles of lures are possible that would employ the principles of this invention. In addition, while a wedge-type dovetail structure is shown in this embodiment, the mating engaging tongue 26 and groove 30 could be of other shapes, such as round, diamond, or T-shaped cross sections. The lure could also have the rib or tongue 26 on the top portion 14 with the groove 30 formed on the lower portion 12.

With this two-part lure, it is possible to change the top or upper portion 14 without removing the lower portion 12 from the line. However, a universal top half 14 will fit on a number of various styles of lower portions to change other factors, such as silhouette and depth that the lure will dive on the retrieve.

While this invention has been described in detail with respect to a preferred embodiment, it should be emphasized that the invention is not limited to that precise embodiment. Rather, many modifications and variations would present themselves to those skilled in the art without departing from the scope and spirit of this invention, as defined in the appended claims.

What is claimed is:

1. A body type fishing lure which comprises a lower body part and an upper body part that is slidably attached to said lower body part so that said upper body part is interchangeable with similar upper body parts to change the appearance of the lure, said lower body part having longitudinally oriented keyway on an upper surface thereof, and said upper body part having engaging means longitudinally oriented on a lower surface thereof slidably mating with said keyway so that said upper body part is slidably removable from said lower body part.

2. A body-type fishing lure according to claim 1 wherein one of said keyway and said engaging means is a tongue, and the other thereof is a mating groove.

3. A body-type fishing lure according to claim 2 wherein said tongue and said groove have mating undercut surfaces to resist vertical separation of the upper and lower body parts.

4. A body-type fishing lure according to claim 3 wherein said tongue and said groove are tapered to wedge together as the upper body part slides rearward on said lower body part.

5. A body-type fishing lure according to claim 1 wherein line attachments and hooks are attached only to the lower portion.

6. A body-type fishing lure according to claim 1 further comprising ball detente means in one of said upper surface of the lower portion and the lower surface of the upper portion, and a mating indentation in the other thereof to hold the upper and lower portions in position after they are slid together.

7. A body-type fishing lure according to claim 1 wherein said keyway and engaging means are shaped such that the upper body part is slidably removable from the lower body part only by sliding the upper body part forward.

* * * * *